No. 878,174. PATENTED FEB. 4, 1908.
G. P. YEAKEL.
FISH SCALING AND CLEANING MACHINE.
APPLICATION FILED JULY 17, 1905. RENEWED AUG. 8, 1907.
7 SHEETS—SHEET 2.
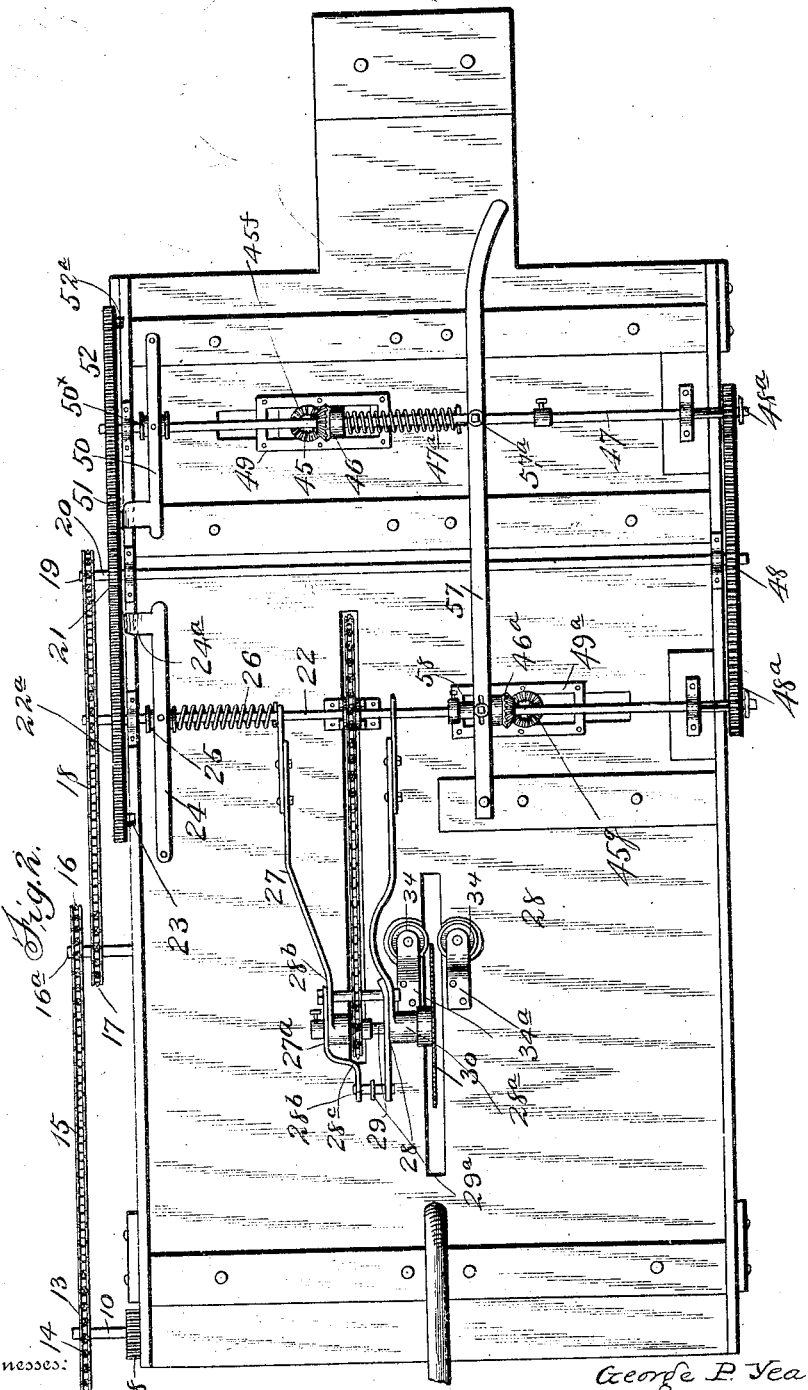
Witnesses:
Inventor:
George P. Yeakel.
By Louis Bagger & Co.
Attorneys

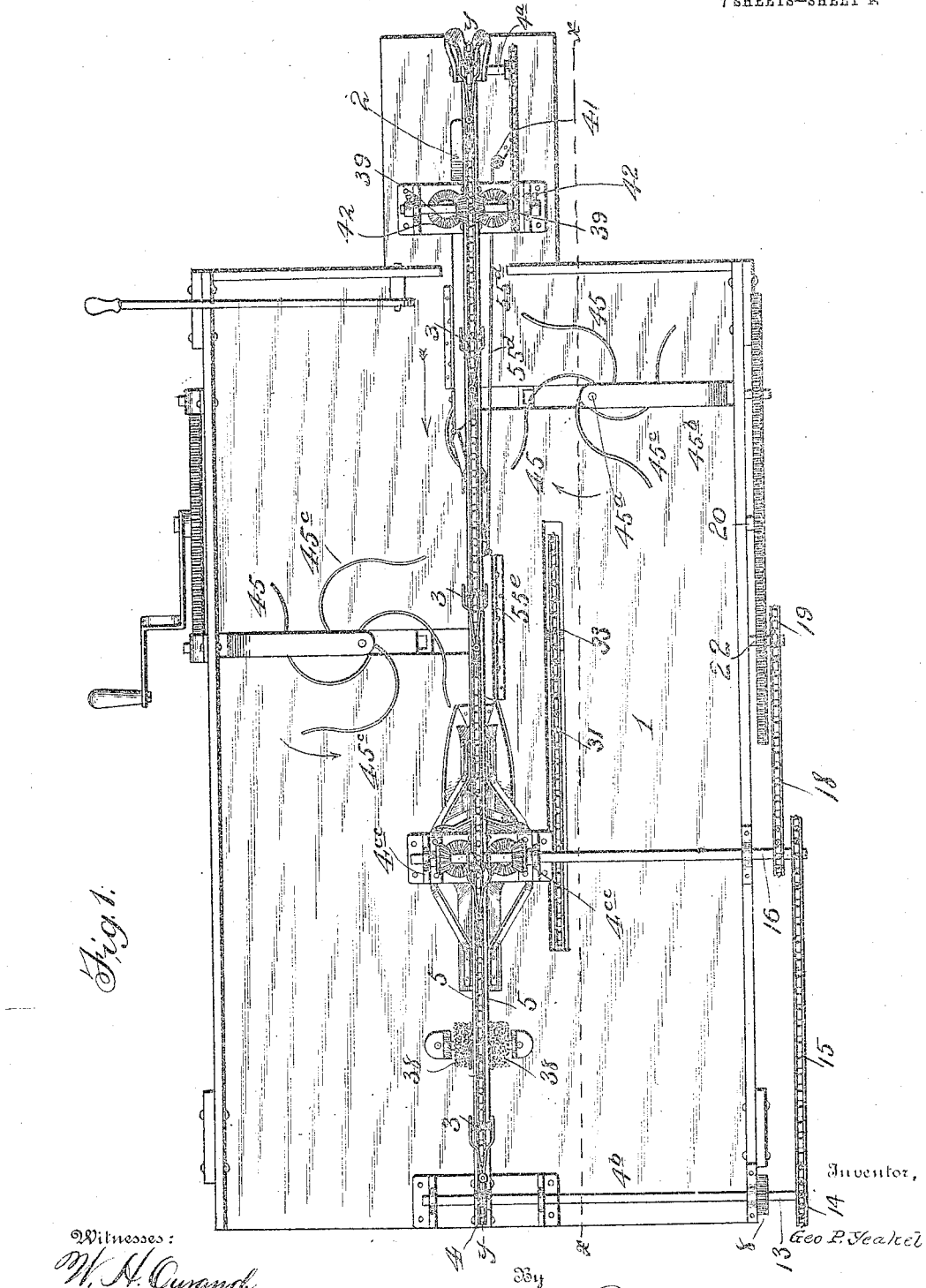

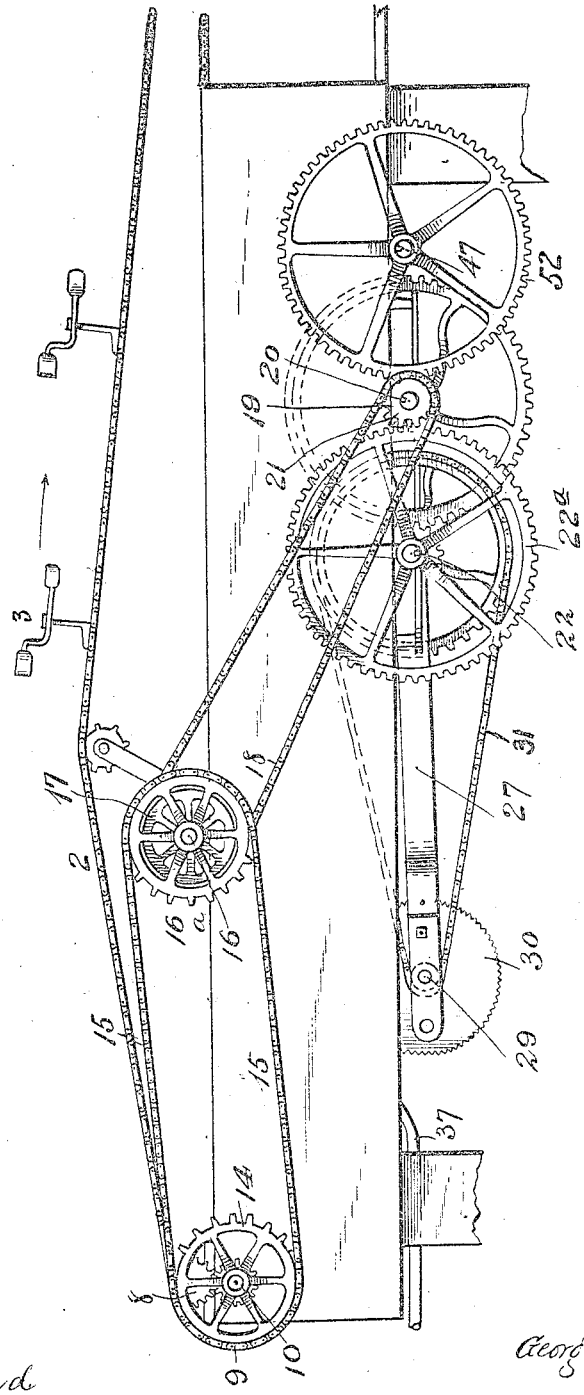

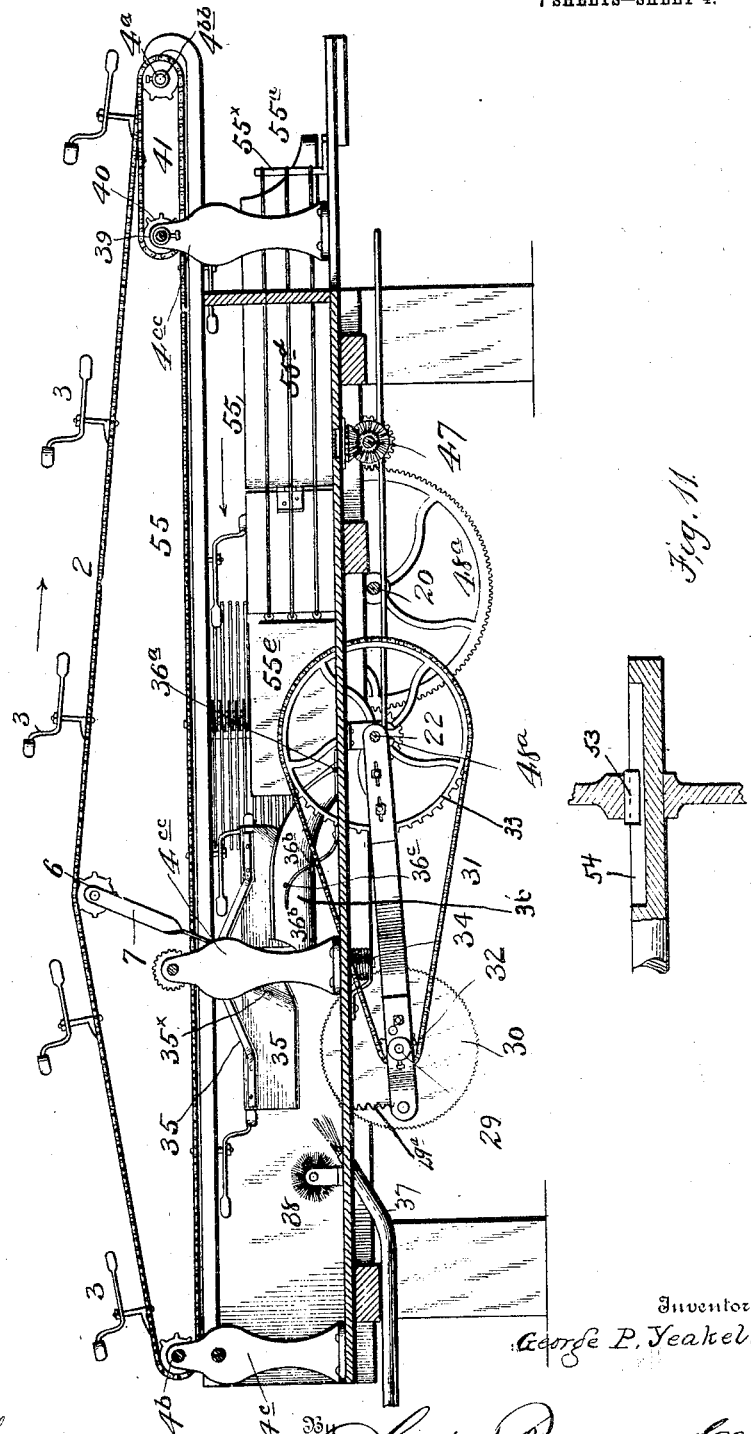

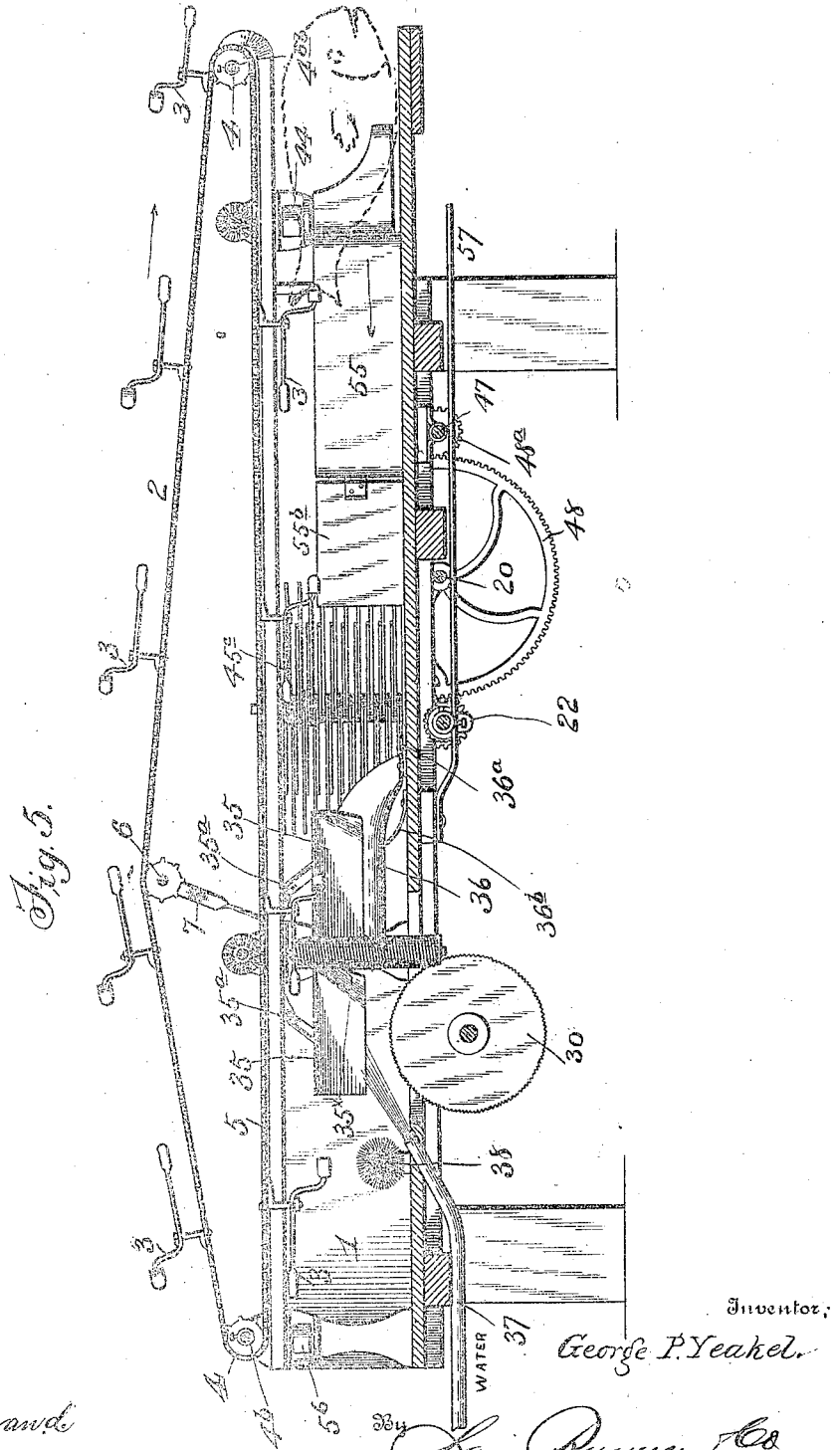

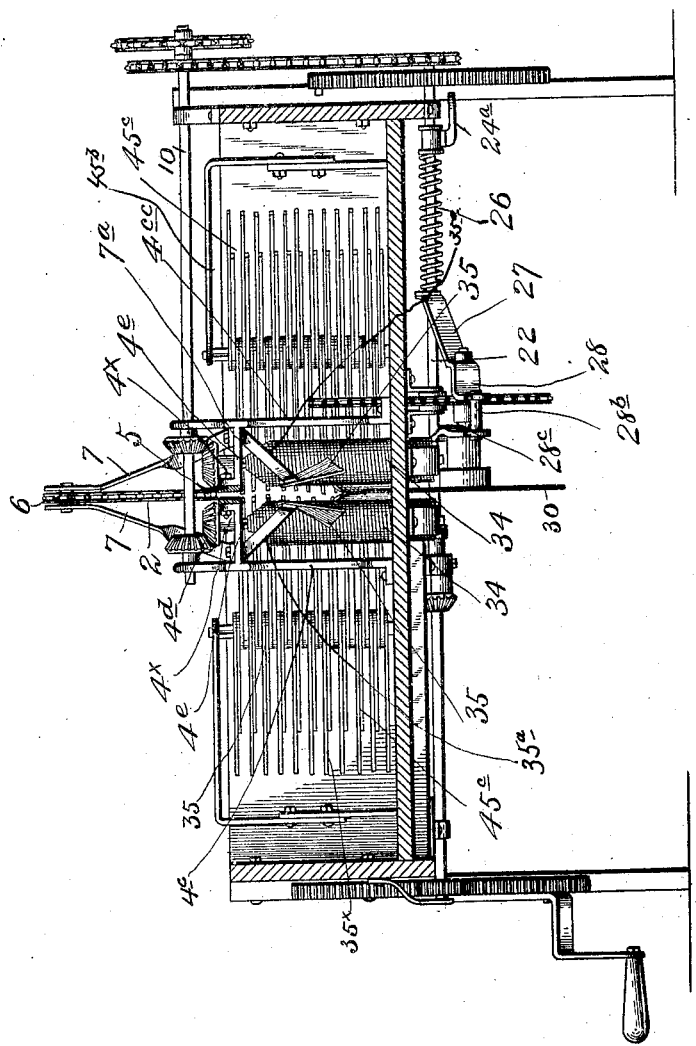

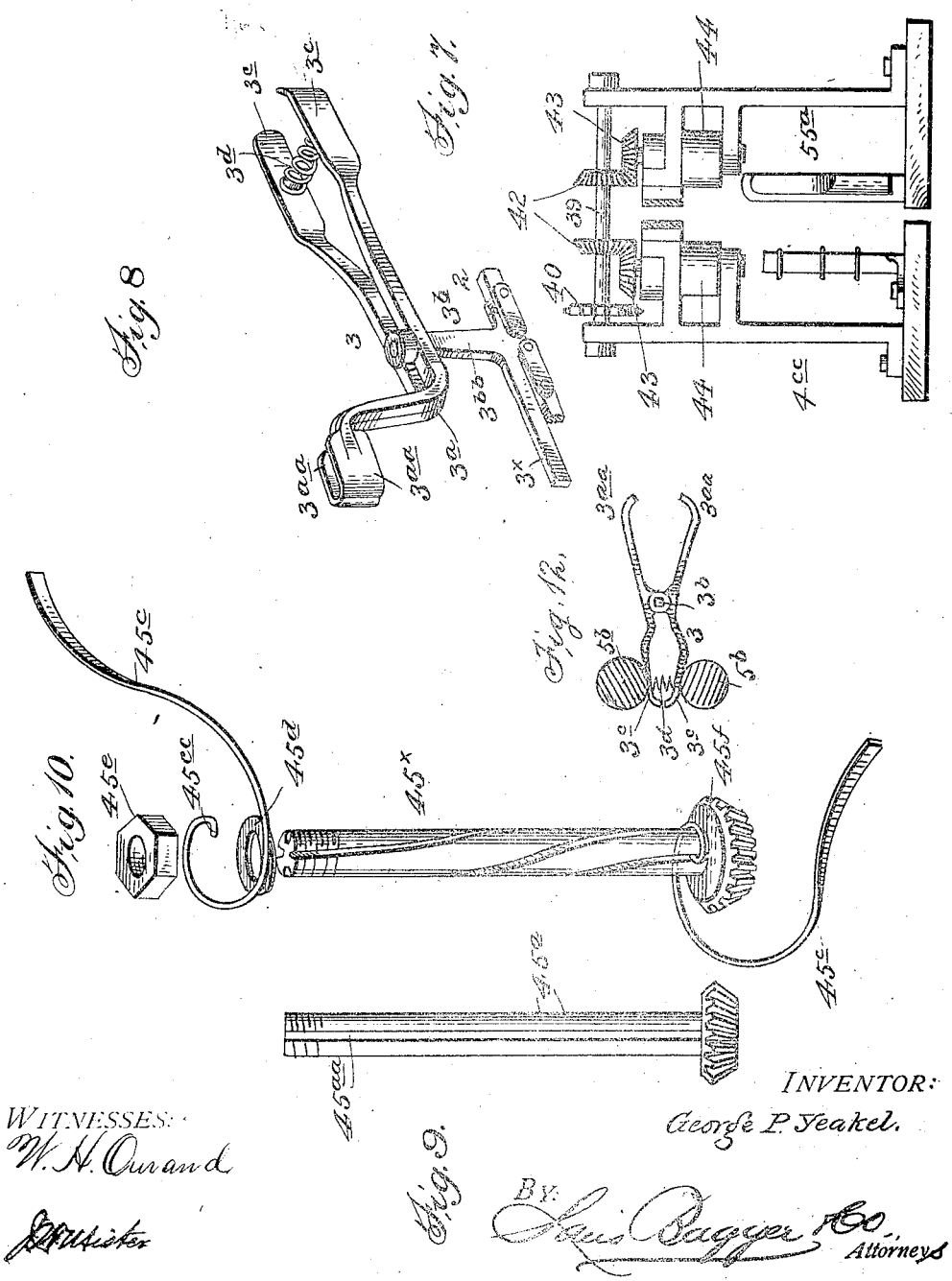

UNITED STATES PATENT OFFICE.

GEORGE P. YEAKEL, OF NORRISTOWN, PENNSYLVANIA, ASSIGNOR OF ONE-THIRD TO CHARLES KELLER, OF NORRISTOWN, PENNSYLVANIA.

FISH SCALING AND CLEANING MACHINE.

No. 878,174.  Specification of Letters Patent.  Patented Feb. 4, 1908.

Application filed July 17, 1905. Serial No. 270,053. Renewed August 8, 1907. Serial No. 387,667.

*To all whom it may concern:*

Be it known that I, GEORGE P. YEAKEL, a citizen of the United States, residing at Norristown, in the county of Montgomery and State of Pennsylvania, have invented new and useful Improvements in Fish Scaling and Cleaning Machines, of which the following is a specification.

My invention relates to improvements in what may be termed fish scaling and cleaning machines.

Objects of the invention are to provide, as indicated, for effectively scaling the fish, and to then continuously perform the operation proper of cleaning the same, all in an expeditious and satisfactory manner, with the result of delivering the fish from the machine scaled, freed of the entrails and washed or cleansed.

Said invention consists of certain features or devices and their combination and arrangement substantially as hereinafter fully disclosed and specifically pointed out by the claims.

In the accompanying drawing illustrating the preferred embodiment of my invention— Figure 1 is a plan view thereof. Fig. 2 is an inverted or bottom view, and Fig. 3 is a side elevation of the machine. Fig. 4 is a vertical longitudinal section produced on the line $x$—$x$ of Fig. 1. Fig. 5 is a like section taken on the line $y$—$y$. Fig. 6 is a rear sectional elevation. Fig. 7 is a front elevation of the forward end bearing-frames for the gearing and shaft of the endless-belt equipped with the fish-conducting or feeding clamps, or carriers, and to which frames are secured the guiding means for the fish. Fig. 8 is an enlarged detached perspective view of a fish-clamp or carrier. Fig. 9 is a detached view in elevation of a shaft of one of the scaling devices. Fig. 10 is a modification of such shaft, with a disassembled wire or strip and a like connected wire or strip. Fig. 11 is an enlarged detailed sectional view with parts broken away showing the sliding or spline and groove connection between certain shafts and pinions. Fig. 12 is a detailed side view of the fish-carrying clamp as exemplified by Fig. 8, showing said clamp when engaged by its jaw-spreading rolls in effecting the release of the fish.

In the carrying out my invention, I provide a suitable receptacle 1 within and upon which is mounted or arranged the operative mechanism as will be now described.

A number of fish-carrying clamps or carriers 3 is connected to an endless belt or chain 2 encompassing sprocket pinions or pulleys 4, $4^a$, the shaft $4^b$ of one of which is suitably journaled in uprights $4^c$ fixed in one end of the receptacle 1. The clamps or carriers 3, referring particularly to Fig. 8, are composed each of two jaw-equipped members $3^a$, with their upstanding portions directly provided with the jaws $3^{aa}$ and their other or horizontal portions suitably fulcrumed or pivoted upon the upstanding or vertical arm $3^{bb}$ of a right-angled belt-attaching member $3^b$. The horizontal arm $3^\times$ of said member $3^b$ is designed to bear upon the underside of the bars or track 5 when the fish is engaged by said jaws and thus brace the same in position, while when the clamps or carriers have traveled to an elevated position, as upon their return movement, the arms $3^\times$ will retain the clamps so as to be still in operative position when the latter have returned to again be supplied with fish. The rear end portions $3^c$ of the jaw-equipped members $3^a$ are somewhat flat and are held normally a suitable distance apart by a spring $3^d$ suitably held in position therebetween as shown, whereby by exerting lateral pressure thereon so as to compress said spring the jaws $3^{aa}$ may be thrown apart or to open position as will be apparent presently. The shaft $4^{bb}$ of the other pulley is suitably carried or supported in the forward upwardly curved end-portions of parallel longitudinal bars 5. These bars are connected by nut-equipped bolts $4^\times$ laterally to upward extending lugs $4^d$ of horizontal arms $4^e$ of the standards or uprights $4^c$ and additional standards or uprights $4^{cc}$ likewise secured within the receptacle 1. Said endless chain or belt 2 is held taut or has its slack compensated by a sprocket wheel or pulley 6 carried or upheld by upwardly extending converging bars 7 suitably secured at their divergent ends as at $7^a$ to the horizontal arms $4^e$ of opposite uprights or standards $4^{cc}$.

Motion is transmitted to the endless belt or chain 2 by means of the engaging sprocket wheel or pulley 4 whose shaft $4^b$ extends laterally beyond the receptacle 1 and is equipped with a pinion 8 gearing with a pinion 9 secured upon a shaft 10 to which is also fixed a second pinion or sprocket pulley 14 driven by an endless chain or belt 15. The latter belt or chain engages, and is itself driven by a second sprocket pulley or wheel 16 upon whose shaft 16ª is fixed another like pulley or wheel 17 driven by an endless chain or belt 18 encompassing and receiving its motion from a small sprocket wheel or pinion 19 fixed to a shaft 20 suitably supported or journaled upon the underside of the receptacle 1. Also fixed to the shaft 20 is a pinion 21 engaged with a very much larger pinion or gear-wheel 22ª whose shaft 22 is also suitably journaled upon the underside of the receptacle-bottom. Said pinion 22ª has a lateral stud 23 to engage a lateral end-lug 24ª of a lever or dog 24 fulcrumed upon the underside of the receptacle-bottom. Said lever 24 is also pivoted to, and carried by a sleeve or collar 25 applied to the shaft 22 and cushioned upon, and controlled by the action of a preferably coiled or helical spring 26 the recoil action of which spring has the effect to return the shaft 22 to its normal position after having been moved endwise as in shifting the movement of the carrying frame of the corresponding scaling device. Said spring is also arranged upon said shaft, between said sleeve and one of two bars or arms 27, 28 or an extension thereof. Said arms or bars are integral with, or have lateral tubular extensions 27ª, 28ª respectively sleeved upon and forming bearings for the shaft or mandrel 29 of a circular fine-toothed saw 30 suitably arranged for engaging and cutting the fish as presently more fully disclosed. Said arms 27, 28 each have the shaft 22 passing therethrough or extensions thereof, and are thus adapted to be carried or supported therefrom, while the saw mandrel or shaft 29 is carried by said arms. Said arms have their tubular end portions preferably connected by screw-bolts 28ᵇ to additional arms or bars 27ª, 28ª respectively, suitably supported upon or carried by the saw-mandrel 29, and to one of said connecting bolts 28ᵇ is connected a wire 29ª, or like means, for suspending and lowering the thus provided yielding saw or saw-mandrel carrying frame, when required, as when the saw is worn away by use. Said suspending wire or medium 29ª passes upward through an opening in the receptacle-bottom and is effectively held against displacement, and may be adapted to provide for adjusting the saw carrying frame, with the saw, for accommodating the latter to the size of the fish to be cut. An endless chain or belt 31, for driving the fish-cutting saw, encompasses a small sprocket wheel or pulley 32, fixed to the saw-mandrel 29, and a much larger similar wheel 33 fixed to the shaft 22 geared up with the driving source of power as above indicated.

Arranged adjacent to the fish-cutting saw, upon practically opposite sides thereof are parallel upright guide-rolls 34 preferably composed each of a coiled spring which may be tapered at its upper end, and having their central sustaining rods secured at the lower ends in downward bent or stepped plates or brackets 34ª secured to the underside of the receptacle bottom, to remove them out of the way, said springs extending down through openings in said bottom. The upper ends of the sustaining rods of said guide-rolls are suitably adapted to retain the corresponding ends of the latter in proper position. These spring guide-rolls, in addition to serving as such for the fish to the saw, also by reason of their yielding or resilient character accomodate themselves to the variations in cross-section of the fish as the latter is fed or carried therebetween by the endless belt or chain, with its clamps or carriers. Also arranged in proximity to the fish-cutting saw, as also to said guide-rolls, two in front of said guide-rolls and two in rear of the latter and above the line of said saw, are opposite pairs of divergent guide-plates 35 with their ends adjacent to said rolls flared as at 35ˣ to assist their guiding action and spaced far enough apart to permit the ready passage of the fish therebetween to deliver said fish to said guide-rolls and to receive and guide the fish therefrom, respectively. Said guide-plates are fixed in position to rigid arms or brackets 35ª secured thereto and to the arms 4ᵉ of the intermediate standards or uprights 4ᶜᶜ as shown, particularly by Fig. 6. Again, arranged just below the forward guide-plates 35 and having its rear end standing close to the guide rolls 34 and somewhat narrowed or tapered toward each rear corner-edge to extend well into the entrance-space to the latter, is a dished or practically V-shaped guide 36. It is held in an upraised position the greater portion of its length in operative relation to the overhanging or forward guide-plates aforesaid by means of upstanding practically S-shaped springs 36ᵇ secured to the receptacle-bottom and resting against lugs or stops 36ᶜ upon said guide 36 said guide being curved or extended downward and forward and hinged or pivoted to the receptacle-bottom as at 36ª. It will thus be seen that, as the fish is carried up, upon said guide 36, the latter will, in event the former should be of a greater size than could be otherwise accomodated, accordingly yield vertically and thus permit of the ready passage of the fish. A section of pipe or hose 37, suitably connected with a source or supply of water under pressure, has its discharge end delivering a stream of water upward and forward, through an opening in the receptacle-bottom, toward and so as to strike the interior of the fish as it is being cut or split by the saw, for cleansing or washing the same. Also, a preferably circular or cylindric brush 38, arranged and suitably supported in position close to the point of delivery of the stream of water upon the fish, serves to remove, as will be readily apparent, the entrails from the fish at this point.

A shaft 39, mounted in the forward end standards or uprights 4$^{cd}$ is equipped with a sprocket pinion 40 encompassed by a short endless chain or belt 41 also engaging, and receiving motion from the pinion 4 of the shaft 4$^{bb}$. Said shaft 39 has fixed to it two beveled pinions 42 engaging or meshing with corresponding pinions 43 fixed to the shafts of rolls 44 suitably journaled in said forward-end standards or uprights 4$^{cc}$ and are for the passage therebetween, and the throwing apart of the jaws of the fish-clamps or carriers 3 at that end of the machine to permit of the placing in between said jaws of the tails of the fish at the beginning of the scaling and cleaning operation as will be presently more fully appreciated.

Scaling devices 45 are arranged upon opposite sides of the line of travel of the fish carrying clamps or carriers 3, one a short distance from the forward end of the receptacle 1 and the other farther rearward as shown for treating or acting upon both sides of the fish and at successive stages of the passage thereof. These devices are composed each of a vertical shaft 45$^a$ suitably held or journaled in a carrying frame 45$^b$ movable transversely within the receptacle 1, and of numerous practically radial wires or scalers proper 45$^c$ suitably connected to said shaft and practically of a pliable character to effectively detach the scales without mutilating the fish. Each of said wires or arms is, in addition to its general radial arrangement, also reversely curved for the more effective engagement thereof with the fish, as is apparent. The arms or wires 45$^c$ have their inner ends slipped downward into longitudinal grooves 45$^{aa}$ in the carrying shaft 45$^a$, each of said ends being bent as at 45$^{cc}$ to the body of the wire to render the holding thereof upon the shaft as against accidental displacement when in action as suggested particularly by Fig. 10. These arms or wires are individually separated and thus held by interposed washers 45$^d$ and a nut 45$^e$ suitably slipped and screwed upon the shafts carrying said wires or arms, respectively. Said shafts are equipped, below the receptacle-bottom, with beveled pinions 45$^f$, 45$^g$ respectively engaging or meshing with the respective corresponding pinions 46, 46$^a$ one of which is carried by the shaft 22, before referred to, and the other carried by a shaft 47. Said shafts 22, 47 are intergeared with the driving shaft 20 by means of intermeshing gear wheels or pinions 48$^a$, 48$^a$, 48, fixed upon said shafts respectively for imparting the requisite rotation to the scaling devices. The scaling device carrying frames 45$^b$ have their lower members arranged to move in frames or guide-ways 49, 49$^a$ fixed in slots produced in the receptacle-bottom to permit the transverse movement of said frames with said scaling devices for a purpose presently disclosed. The shaft 47, as in the case of the shaft 22 as previously described, is equipped with a lever or dog 50 the latter being pivoted upon a sleeve or collar 50$^\times$ and having a lateral lug 51 engaged by a stud 52$^a$ projecting laterally from a gear-wheel or pinion 52 engaging and receiving motion from the pinion 21 before described, gearing with the wheel or pinion 22$^a$ carrying the stud 23 engaging or actuating the corresponding lug-equipped lever or dog 24. It will be understood that the shafts 22 and 47 have a sliding connection with the pinions or gear wheels 22$^a$ and 52, as well as with the pinions 48$^a$, this being provided for by spline and groove arrangement 53, 54 as shown more especially by Fig. 11, in order to permit of the shifting movement of said shafts together with the scaling-device carrying frames. Also that the shaft 47 is equipped with a spring 47$^a$ to effect the automatic return movement thereof to its former position after having been moved endwise, as in shifting the scaling-device carrying frame arranged in connection therewith.

Arranged intermediately of the forward-end uprights or standards 4$^{cc}$, or the point of placing the fish upon the endless feeding chain or belt 2 and the point of delivery of the fish to the guides for conducting the latter to the saw, is an additional suitable guide to hold the fish in proper position for scaling. Said guide consists of a fixed board-like guide-section 55; a like hinged or pivoted guide-section 55$^a$ at the forward end of the aforesaid section; a second similar fixed guide-section 55$^b$ close to the part 36$^b$; and a second like hinged or pivoted guide-section 55$^c$, interposed between the aforesaid fixed and hinged guide-sections, all arranged upon one side of the path of travel of the fish-carrying clamps or carriers 3, and of a number of guide wire-sections or strands 55$^d$ secured to a post 55$^\times$ at the forward end of the receptacle and to a pivoted guide-section 55$^e$, contiguous to the part 36, all arranged upon the opposite side of the line of travel of said fish-carrying clamps or carriers. It will be noted, in this connection, that a laterally yielding action is provided to enable said guide board-sections and said guide wire-strands or sections to yield in conformity with the different thicknesses of the fish as the latter passes therebetween.

It will be observed that, as a fish is presented tail-end foremost, in position to be engaged by the clamps 3, the normally held-apart rear-end portions of said clamps, will be engaged by, and be forced toward one another, by rolls 44, when said jaws will be moved to open-position which will permit the insertion of the tail of the fish between the clamp-jaws. Immediately the rear-end portions 3ᶜ of the clamp are sprung apart, as when they escape from between the rolls 44, the jaws 3ᵃᵃ of the clamp will grip the fish by the tail and thus hold it and permit the feeding thereof through the machine for the action of the scaling devices and the cutting action of the saw, as also the cleaning or gutting-action of the brush 38, and the cleansing action of the water-thrown by pipe 37. The fish, still being carried forward, the clamp rear-end portions are finally engaged by a similar pair or set of rolls 56, at the extreme rear end of the machine, for throwing apart the jaws and thus releasing the fish. It will so be noted that, as the scaling-device-carrying frames are under the control of the action of the gear-driving mechanism of the fish-clamp carrying belt as aforesaid and that said mechanism is so timed in its action that the studs 23 and 52ᵃ thereof will be engaged by the lugs 24ᵃ and 51 of the levers or dogs 24 and 50, respectively when the fish-clamps have arrived nearly opposite the points where otherwise said scaling devices would strike said clamps, said scaling devices will be moved away from, or out of the line of travel of said clamps at that juncture, thus guarding against such contact between these parts. By the use of a hand-lever 57 suitably pivoted in position and having a slotted and sleeved connection 58 with shaft 22 and suitably coupled as at 57ᵃ with the shaft 47, the shifting of the scaling-device-carrying frames may be effected by hand.

In the modification as disclosed by Fig. 10, a shaft 45ˣ may be substituted for shaft 45ᵃᵃ, having a spiral groove 45ˣˣ therein for the reception of the inner bent end-portions of the wires 45ᶜ.

I claim:

1. A machine of the character described, comprising a scaling device, with its carrying frame arranged to have a sliding movement and provided with a rotary shaft equipped with numerous wires with loose outer or free ends, a traveling endless-belt arranged in connection therewith, clamps carried by said endless-belt, means effective to set said clamps to engage a fish, and means adapted for imparting an intermittent lateral movement when said clamps have arrived about opposite said scaling device to prevent contact therebetween to said scaling-device-carrying frame.

2. A machine of the character described, comprising a traveling endless-belt carrying a clamp having its jaw-equipped members fulcrumed upon a right-angled support with one arm thereof effective to retain said clamp in operative relation to the fish, and means for setting said jaw-members in open position for receiving or engaging the fish the horizontal arm or portion of said support adapted to provide for holding the support in operative position together with said clamp.

3. A machine of the character described, comprising a traveling endless-belt, a clamp having its jaw-members fulcrumed upon a right-angled support connected to said belt, said jaw-members themselves being practically right-angled in outline, with their jaws at the lower ends of their vertical portions and their horizontal portions held normally apart by an interposed spring, and means for setting said jaws in open position, for engagement with the fish the horizontal arm of said support adapted to hold said support in operative position together with said clamp.

4. A machine of the character described, comprising a traveling endless-belt, a clamp having its jaw-equipped members fulcrumed upon a right-angled support with one arm thereof adapted to retain said clamp in operative relation to the fish, means for setting said jaw-members in open-position for receiving or engaging the fish, and a scaling device arranged to operate in connection with said fish-engaging clamps the horizontal arm of said support adapted to hold the support in operative position, together with said clamp.

5. A machine of the character described, comprising a traveling endless-belt, a fish-engaging or carrying clamp a right-angled support or bracket connected to said belt and having said clamp pivoted thereto, the horizontal arm of the support adapted to retain the latter in operative position together with said clamp, and a rotary saw arranged in the path of the movement of the fish for cutting or severing the latter.

6. A machine of the character described, comprising a traveling endless-belt, a fish-carrying clamp a support for said clamp connected to said belt and having a horizontal arm adapted to retain the support in operative position together with said clamp, means for setting said clamp in open-position to receive the fish, a scaling device arranged for operation in connection with said fish-carrying clamp and belt, a rotary saw arranged in the line of the movement of the fish, and means effective for re-opening the jaw-members of said clamp at the conclusion of the fish-cleaning operation for releasing the cleaned fish.

7. A machine of the character described, comprising a traveling endless-belt, a fish-carrying clamp a support or bracket connected to said belt and having a horizontal arm adapted to retain the support in operative position, together with said clamp, means for setting the jaws of said clamp in open position for receiving the fish, a scaling device arranged for coöperative action with said belt and fish-carrying clamp and furnished with reversely curved resilient wires adapted to engage the clamp-carried fish, a rotary saw arranged in the path of the travel of said clamp, means for cleaning the clamp-carried fish arranged beyond and in alinement with said saw, and means effective to provide for cleansing the fish when acted upon by the latter.

8. A machine of the character described, comprising a traveling endless-carrier, a fish-carrying clamp, a rotary saw arranged in the line of travel of said clamp, a vertically-yielding dished guide opposed directly forward of said saw, and divergent fixed guide-members overhanging the aforesaid guide.

9. A machine of the character described, comprising a traveling endless-carrier, a fish-carrying clamp connected to said carrier, a scaling device arranged alongside of the line of the travel of said fish-carrying clamp, and a guide consisting of two sets of guide-sections or members, arranged upon opposite sides of said line of travel, one set consisting of fixed and yielding members and the other set of a pivoted or swinging member and wire strands suitably strung in position.

10. A machine of the character described, comprising a traveling endless-carrier equipped with means for carrying a fish, a scaling device arranged to engage the fish carried by said clamp, with its carrying frame laterally movable with relation to said fish-carrying means, and actuating mechanism for said scaling device automatically effective to impart such lateral movement to said carrying frame.

11. A machine of the character described, comprising a traveling endless-carrier equipped with means for carrying a fish, a scaling device with its shaft-supporting frame movable laterally with relation to said fish-carrying means, and gear-mechanism for driving said endless-carrier and said scaling device, with one of its pinions equipped with a lateral stud adapted to engage a lug-equipped lever or dog effective, with adjunctive parts, to impart such movement to said shaft-supporting frame.

12. A machine of the character described, comprising a traveling endless-carrier equipped with means for carrying a fish, scaling devices arranged upon opposite sides of the line of travel of said fish-carrying means and having their carrying frames laterally movable with relation to said endless-carrier and fish-carrying means, lug-equipped levers or dogs effective, with adjunctive parts, to impart endwise movement to shafts connected up with said scaling-device-carrying frames, and gear-mechanism for actuating said endless-carrier and said scaling devices, with opposed intergeared pinions thereof provided with lateral studs adapted to engage the lugs of said lug-equipped levers or dogs.

13. A machine of the character described, comprising a traveling endless-carrier equipped with means for carrying a fish, opposed upright guide-rolls each constituted of a coiled spring, and means for cutting or severing the fish as it is guided thereto from between said rolls.

In testimony whereof I affix my signature, in presence of two subscribing witnesses.

GEORGE P. YEAKEL.

Witnesses:
   Eugene D. Egbert,
   David Kratz.